United States Patent
Saad (10) Patent No.: US 8,544,808 B2
(45) Date of Patent: Oct. 1, 2013

(54) VENTILATION SUPPORT FOR LAPTOP COMPUTERS

(76) Inventor: David J. Saad, Paradise, CA (US)

( * ) Notice: Subject to any disclaimer, the term of this patent is extended or adjusted under 35 U.S.C. 154(b) by 62 days.

(21) Appl. No.: 11/115,256

(22) Filed: Apr. 27, 2005

(65) Prior Publication Data

US 2006/0243878 A1    Nov. 2, 2006

(51) Int. Cl.
*A47B 91/00* (2006.01)
*A47G 29/00* (2006.01)
*B65D 19/00* (2006.01)

(52) U.S. Cl.
USPC ...... 248/346.06; 248/454; 248/447; 248/455; 248/460; 248/346.01; 248/346.05; 248/165; 248/166; 108/9

(58) Field of Classification Search
USPC ............. 248/917–919, 444, 446, 454, 447, 248/455, 460, 346.01, 346.05, 346.06, 346.3, 248/349.1, 165, 166; 361/687–690; 108/9
See application file for complete search history.

(56) References Cited

U.S. PATENT DOCUMENTS

| | | | | |
|---|---|---|---|---|
| 1,869,278 A | * | 7/1932 | Ramelli | 248/455 |
| 2,219,091 A | * | 10/1940 | Henderson | 248/452 |
| 2,471,003 A | * | 5/1949 | Monahan | 108/9 |
| 4,565,343 A | * | 1/1986 | Lake et al. | 248/346.06 |
| 4,568,801 A | * | 2/1986 | Gates et al. | 379/454 |
| 4,618,119 A | * | 10/1986 | Powell | 248/456 |
| 4,624,433 A | * | 11/1986 | Henneberg | 248/346.06 |
| 4,635,893 A | | 1/1987 | Nelson | |
| 5,141,199 A | * | 8/1992 | Nemeth | 248/455 |
| 5,297,003 A | * | 3/1994 | Nomura et al. | 361/680 |
| 5,337,985 A | | 8/1994 | Hale | |
| 5,375,800 A | | 12/1994 | Wilcox et al. | |
| 5,503,361 A | * | 4/1996 | Kan-O et al. | 248/688 |
| 5,607,135 A | * | 3/1997 | Yamada | 248/456 |
| 5,651,525 A | * | 7/1997 | Yang | 248/456 |
| 5,810,316 A | * | 9/1998 | Eby | 248/451 |
| 5,915,661 A | * | 6/1999 | Silverman et al. | 248/465.1 |
| 6,098,952 A | * | 8/2000 | Tonn | 248/688 |
| 6,256,193 B1 | | 7/2001 | Janik et al. | |
| 6,266,241 B1 | | 7/2001 | Van Brocklin et al. | |
| D449,048 S | | 10/2001 | Yu et al. | |
| 6,414,842 B1 | | 7/2002 | Cipolla et al. | |
| 6,474,614 B2 | | 11/2002 | MacEachern | |
| 6,527,241 B1 | | 3/2003 | Lord | |
| 6,554,242 B2 | * | 4/2003 | Kim | 248/371 |
| 6,568,650 B2 | * | 5/2003 | Helmetsie et al. | 248/678 |
| 6,816,365 B2 | | 11/2004 | Hill et al. | |
| 6,825,415 B1 | * | 11/2004 | Chen et al. | 174/63 |
| 7,600,736 B2 | * | 10/2009 | Lee | 248/551 |
| 8,070,124 B2 | * | 12/2011 | Hu | 248/346.5 |
| 8,089,760 B2 | * | 1/2012 | Yi-Chang | 361/679.59 |
| 8,172,191 B1 | * | 5/2012 | Zimbalatti | 248/346.01 |

(Continued)

*Primary Examiner* — Terrell McKinnon
*Assistant Examiner* — Michael McDuffie (57) ABSTRACT

The ventilation support for laptop computers provides support for a laptop computer on an uneven or soft surface to allow improved air circulation for the cooling of the laptop computer. The ventilation support for laptop computers includes a flat, planar panel generally matching the bottom surface dimensions of the laptop computer. A front edge of the panel is hinged to the front edge of the bottom surface of the laptop computer. One or more collapsible support members join a rear portion of the panel to a rear portion of the bottom surface of the laptop computer. The collapsible support members will support the laptop computer above the panel in the open position during use, but readily collapse to allow the panel to be placed into the closed position for storage. The collapsible support member(s) may be rigid and unitary, or articulated.

17 Claims, 6 Drawing Sheets

(56) References Cited

U.S. PATENT DOCUMENTS

| | | |
|---|---|---|
| 2002/0003197 A1 | 1/2002 | MacEachern |
| 2004/0026590 A1 | 2/2004 | Lin |
| 2004/0060687 A1 | 4/2004 | Moss, II |
| 2008/0316692 A1* | 12/2008 | Jacobs et al. ............ 361/683 |
| 2010/0288902 A1* | 11/2010 | Liu ........................ 248/349.1 |

* cited by examiner

VENTILATION SUPPORT FOR LAPTOP COMPUTERS

BACKGROUND OF THE INVENTION

1. Field of the Invention

The present invention relates to cooling devices for computers and, more particularly, to a ventilation support for laptop computers.

2. Description of the Related Art

Laptop computers are widely used in a variety of settings, from being positioned on a desktop to being placed on a user's lap, furniture cushions, bed covers, and other diverse environments. The location of the laptop computer and the nature of the surface where the laptop computer is placed may significantly affect cooling of the laptop computer's electronics, which are often prone to generating significant heat during operation.

In addition to the need for cooling of the laptop computer's electronics, a user comfort factor exists in that a laptop computer placed on a user's lap will transfer heat to the user. Excessive heat becomes uncomfortable for the user.

Significant airflow is generally required to maintain proper cooling of the laptop computer's electronics. Positioning the laptop computer on a soft or uneven surface may lead to the blocking of air vents in the casing of the laptop computer, diminishing airflow. Even on a hard and even surface, such as a desktop, cooling airflow may be limited by the proximity of the bottom surface of the laptop computer to the desktop surface.

Various devices have been devised that result in the enhanced airflow to and around a laptop computer. Many devices simply elevate the rear end of the laptop computer, and many are intended for ergonomic effect in positioning the laptop computer's keyboard, rather than a specific airflow or cooling effect. Some laptop computers are manufactured with collapsible legs attached to a bottom rear portion of the laptop computer. While such legs may create an additional airspace beneath the laptop computer when placed on a smooth surface, such as a desktop, the legs may be wholly ineffective on a soft or uneven surface.

A variety of cradles and supports are available as an accessory device separate and apart from the laptop computer itself. In one configuration, a supporting device provides a flat pad having upwardly protruding pegs along a rear edge. A laptop computer is placed on the pad, with the rear end of the laptop computer elevated by the pegs to create airspace between the bottom of the laptop computer and the pad. However, such accessory devices are separate from the laptop computer and are often cumbersome, creating the need to transport the accessory device along with the laptop for portable operation. In addition, because the support accessory is separate from the laptop computer, the support accessory may become separated from the laptop computer during use, especially when used on the user's lap, or on an unstable and uneven surface, such as furniture cushions, bed covers or pillows, or the like.

Thus, a ventilation support for laptop computers solving the aforementioned problems is desired.

SUMMARY OF THE INVENTION

The ventilation support for laptop computers provides support for a laptop computer on an uneven or soft surface to allow improved air circulation for the cooling of the laptop computer. The ventilation support for laptop computers includes a flat, planar panel generally matching the bottom surface dimensions of the laptop computer. A front edge of the panel is hinged to the front edge of the bottom surface of the laptop computer, so that the panel is movable between a closed position, wherein the panel lies flush against the bottom surface of the laptop computer, and an open position, wherein a rear edge of the panel is spaced away from the bottom surface of the laptop computer.

One or more collapsible support members join a rear portion of the panel to a rear portion of the bottom surface of the laptop computer. The collapsible support members will support the laptop computer above the panel in the open position during use, but readily collapse to allow the panel to be placed into the closed position for storage.

The space provided between the panel and the bottom of the laptop computer allows improved cooling airflow across the bottom surface of the laptop computer, even when the laptop computer is used on a soft or uneven surface.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
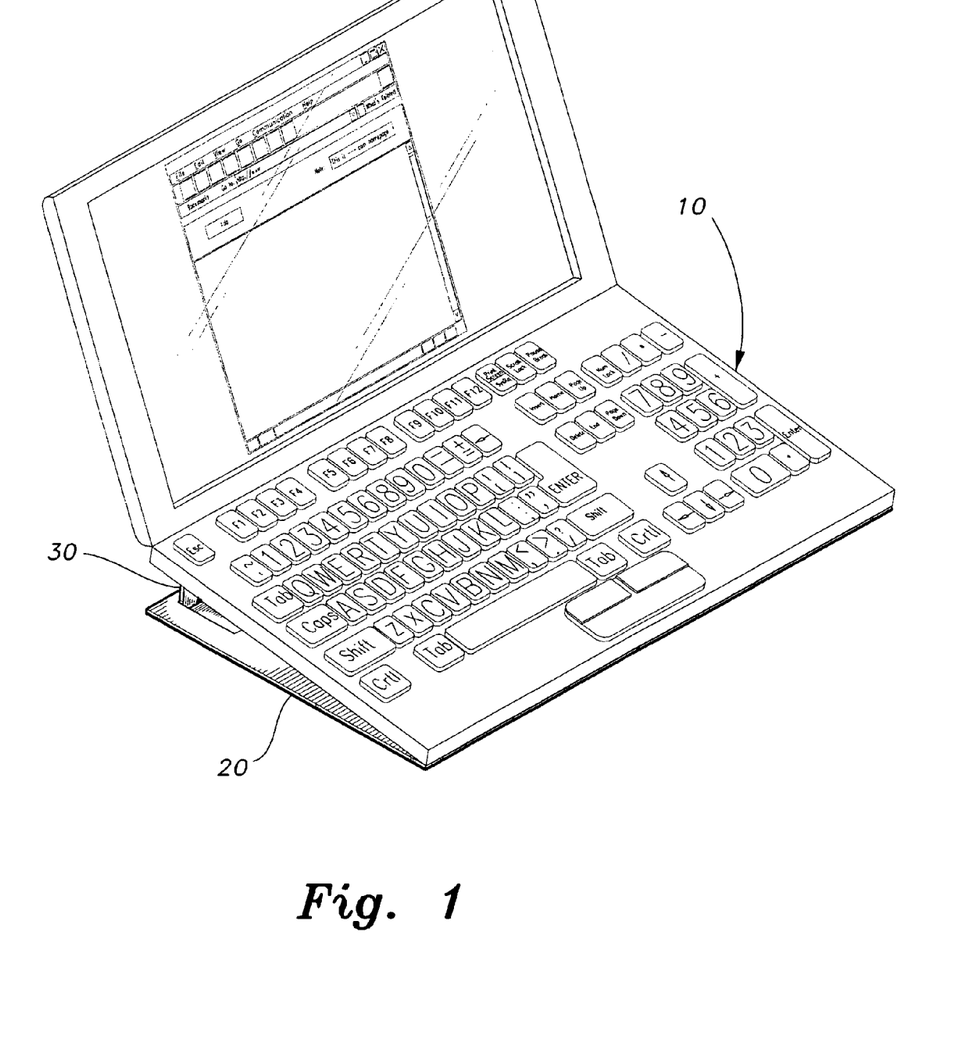
FIG. 1 is an environmental, perspective view of a laptop computer incorporating an integral ventilation support for laptop computers according to the present invention.
Figure 2A:
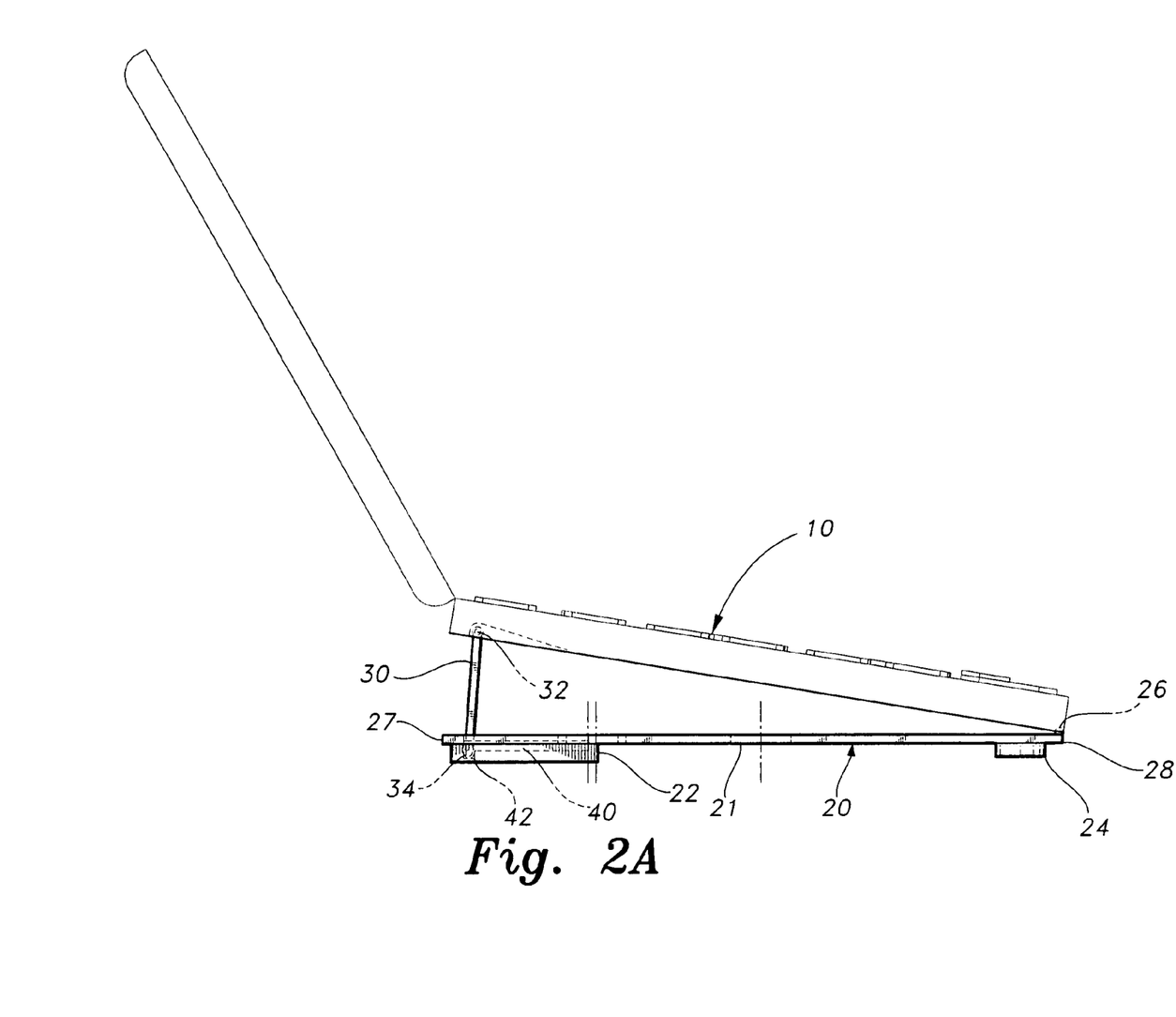
FIG. 2A is a side view of the laptop computer shown in FIG. 1 showing the integral ventilation support for laptop computers fully extended.
Figure 2B:
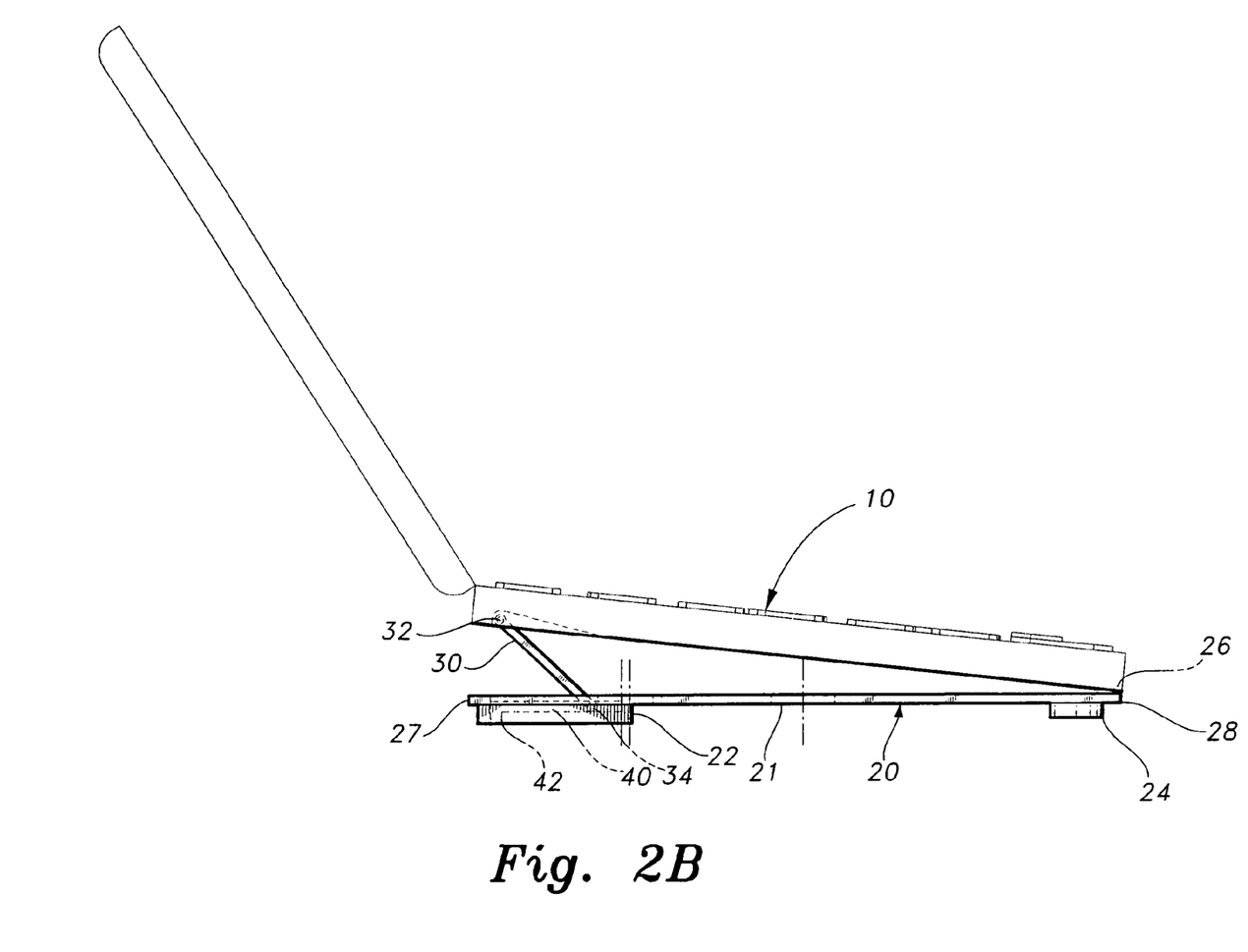
FIG. 2B is a side view of the laptop computer shown in FIG. 1 showing the integral ventilation support for laptop computers partially closed.

The present invention is a ventilation support for laptop computers. Referring to FIGS. 1, 2A, and 2B, a laptop computer 10 is shown with a ventilation support 20 for laptop computers according to an embodiment of the present invention wherein the ventilation support 20 is an integral part of the laptop computer 10. Laptop computers are well known in the art, so that the structure of the laptop computer will not be described in detail, it being sufficient to note that the laptop computer 10 has a keyboard mounted in a base and a display pivotally mounted to the base of the laptop.

The ventilation support 20 includes a thin, planar, rectangular (or other shape conforming to the base of the laptop computer 10) panel 21 of rigid and lightweight plastic, metal, or other suitable material, having a front edge 28 and a rear edge 27. The front edge 28 of the panel 21 is attached to the bottom front edge of the laptop computer 10 by at least one hinge 26, whereby the ventilation support 20 may be moved between a closed position, wherein the panel 21 lies flush against the bottom surface of the laptop computer 10, and an open position, wherein the rear edge 27 of the panel 21 is spaced away from the bottom surface of the base of the laptop computer 10.

At least one collapsible support member is engaged between the bottom surface of the laptop computer 10 and the panel 21. In one embodiment, the collapsible support member 30 is an elongated rectangular member having a first pair of laterally extending pins 34 defining a first end of the support member 30, and a second pair of laterally extending pins 32 defining a second end of the support member 30. The first pair of laterally extending pins 34 is slidably engaged within a track 40 defined in the panel 21, while the second pair of laterally extending pins 32 are pivotally engaged to the bottom surface of the laptop computer 10, e.g., the pins 32 may be retained by loops or hinge knuckles attached to, and recessed in, the base of the laptop computer 10.

Figure 4:
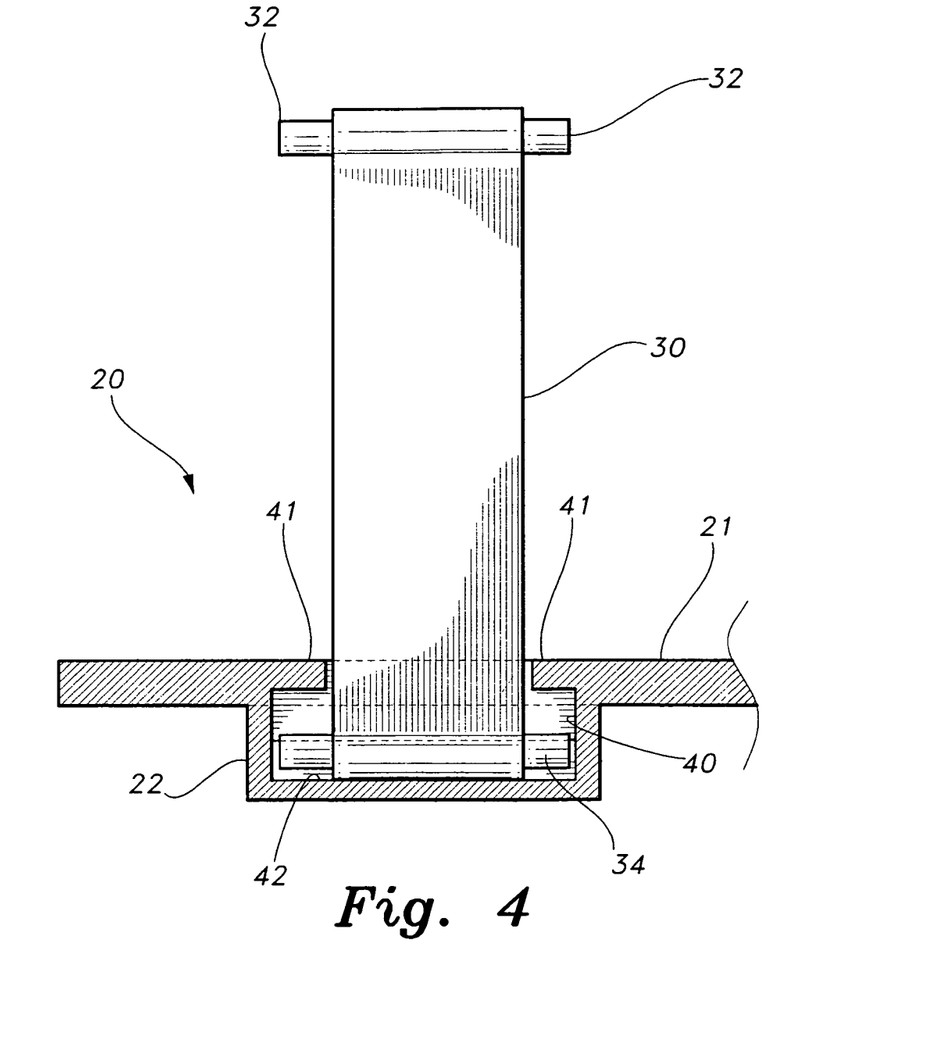
FIG. 4 is a fragmented elevation view showing a support member in a raised position and the ventilation support panel in vertical section to show details of the track defined in the ventilation support according to the present invention.

Track 40 is an elongated recess in the surface of the panel 21, located generally near the rear edge 27 of the panel 21. Referring particularly to FIG. 4, it will be seen that the track 40 includes a pair of top flanges 41 extending laterally into the recess above the ends of pin 34 in order to retain the pin 34 within the track 40, but permitting the first end of support member 30 to both slide and pivot within track 40. Given the generally thin nature of the panel 21, the track 40 is formed in a thickened portion 22 of the panel 21, the thickened portion 22 functioning as a foot on the bottom of the panel 21 and providing sufficient thickness that the track 40 can accommodate the support member 30 when the ventilation support 20 is in the closed position. Feet 24 may be formed on the panel 21 near the front edge 28 for leveling the ventilation support 20 opposite the thickened portion or portions 22.

Figure 3:
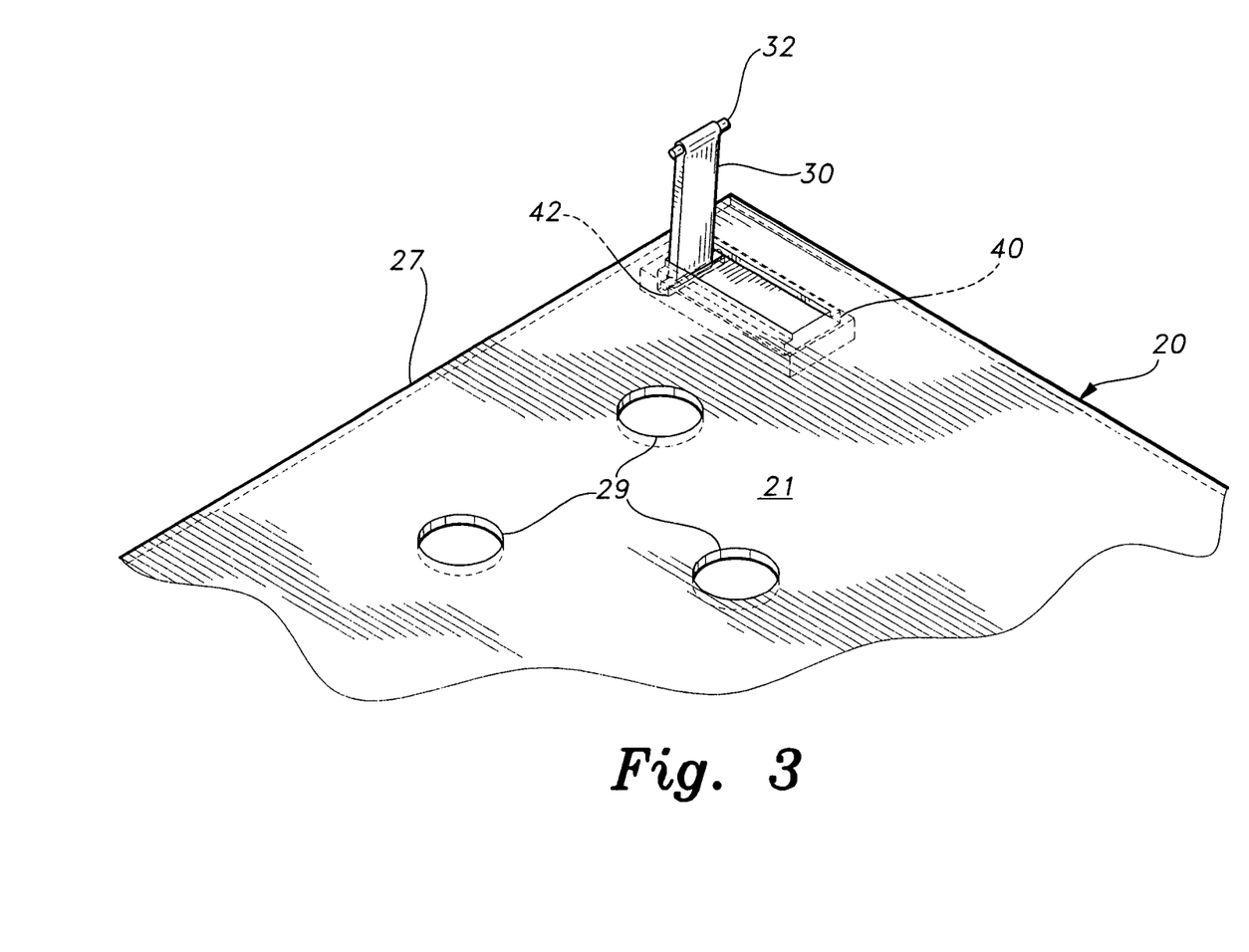
FIG. 3 is a partial top perspective view of the ventilation support for laptop computers according to the present invention, showing a support member structure in greater detail.

Referring particularly to FIGS. 3 and 4, a pocket 42 formed in the track 40 proximate to the rear edge 27 of the panel 21 retains the support member 30 when the ventilation support 20 is in the fully opened position, as the first pair of laterally extending pins 34 drop into the pocket 42 to prevent their rearward movement along the track 40. To close the ventilation support 20, the pins 34 are lifted from the pocket 42 and allowed to slide along the track 40, allowing the support member 30 to fold or collapse as the ventilation support 20 is moved into the closed position. Support member 30 is shown adjacent to a side edge of the panel 21, as in a configuration employing a pair of support members 30, each support member 30 being adjacent to opposing side edges of the panel 21. It can be recognized that alternate configurations may be employed, such as a single centrally located support member.

Also shown in FIG. 3 are apertures 29 formed through the panel 21. The apertures 29 are located coincident with air vents on the bottom of the laptop computer 10 so that cooling airflow is not impeded by the panel 21 when the ventilation support 20 is in the closed position.

Figure 5A:
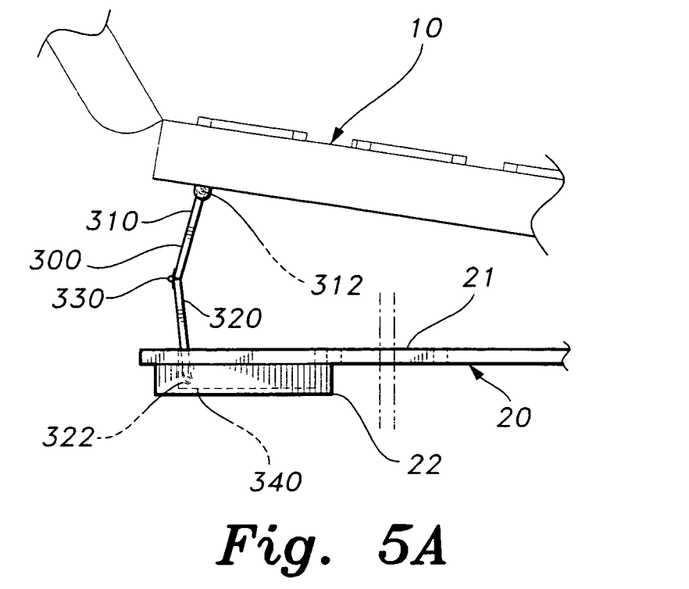
FIGS. 5A and 5B are side views of an alternative embodiment of a ventilation support for laptop computers showing an articulated collapsible support member in a locked position and a partially collapsed position, respectively.
Figure 5B:
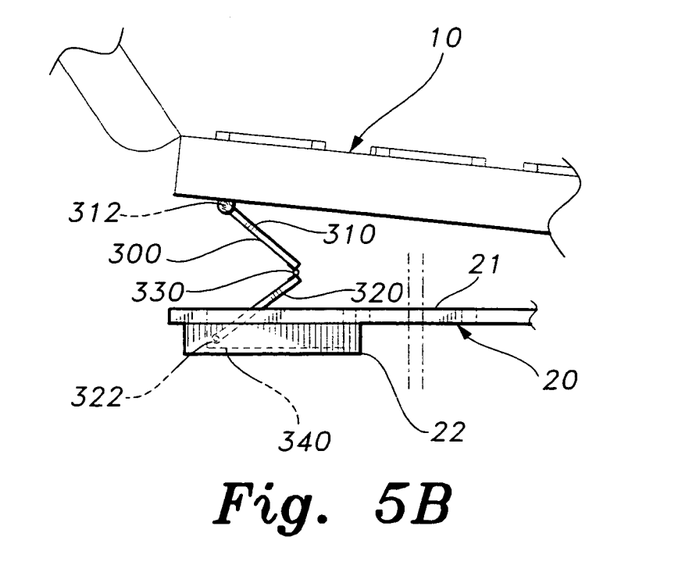

Turning now to FIGS. 5A and 5B, an alternative collapsible support member 300 is shown. In this embodiment, the ventilation support 20 again includes a flat, rigid, planar rectangular (or other shape conforming to the shape of the base of the laptop computer 10) panel 21 having substantially the same length and width dimensions as the bottom surface of the laptop computer 10. The panel 21 has a front edge pivotally attached to the front edge of the bottom surface of the laptop computer by at least one hinge, in the manner shown by FIGS. 2A and 2B.

The panel has a recess 340 defined therein to accommodate collapsible support member 300 when the support member 300 is fully collapsed, the support member 300 being housed in recess 340 so that the bottom surface of the laptop computer 10 lies flush against and abuts panel 21. Collapsible support member 300 includes a first arm 310 having one end 312 pivotally attached to the bottom surface of the laptop computer 10. Collapsible support member 300 has a second arm 320 having an end 322 pivotally attached to panel 21 within one end of recess 340. The opposite ends of arms 310 and 320 are articulated by a hinge 330.

As shown in FIG. 5A, the ventilation support 20 may be raised and locked in position with the hinge extending slightly rearward. When the ventilation support 20 is no longer required, the hinge 330 may be moved forward, as shown in FIG. 5B, to fold the arms 310 and 320 together and lower the rear edge of the laptop until both arms 310 and 320 are disposed within the recess 340 and the bottom surface of the laptop computer 10 abuts panel 21. Although only a single collapsible support member 300 is visible in FIGS. 5A and 5B, it will be obvious that the ventilation support 20 may have either a single, centrally disposed collapsible support member 300, or a pair of symmetrically disposed collapsible support members on opposite sides of the laptop computer 10.

It will be understood that although only two arms 310 and 320 are shown in FIGS. 5A and 5B, the collapsible support arm 300 may comprise more that two arms joined by hinges. It is to be understood that the present invention is not limited to the embodiment described above, but encompasses any and all embodiments within the scope of the following claims.

I claim:

1. A ventilation support for a laptop computer, the laptop computer having a bottom surface and front and rear edges, the ventilation support comprising:
   a planar panel having a front edge and a rear edge, the front edge being pivotally attached to the front edge of the bottom surface of the laptop computer, whereby the panel is movable between an open position and a closed position, the panel having at least one recess defined therein; and
   at least one collapsible support member having a first end and a second end, the first end being pivotally attached to the panel and the second end being pivotally attached to the bottom surface of the laptop computer, the collapsible support member being disposed within the panel recess when the panel is in the closed position so that the bottom surface of the laptop computer lies flush against the panel.

2. The ventilation support according to claim 1, wherein said recess comprises a track defined within said panel, the first end of said at least one collapsible support member being slidably and pivotally engaged in the track.

3. The ventilation support according to claim 2, wherein said collapsible support member comprises a rigid, unitary rectangular body, the first end of the body having pins extending laterally therefrom, the track having opposing top flanges extending into the recess above the pins in order to slidably and rotatably retain the first end of the collapsible support member in the track.

4. The ventilation support according to claim 3, wherein said track has a pocket defined in an end thereof, the pin being lowered into the pocket to lock the panel in the open position, and raised from the pocket to slide along the track into the closed position.

5. The ventilation support according to claim 3, wherein said panel has a thickened portion extending below the panel and defining a foot, the track being defined in the foot.

6. The ventilation support according to claim 1, wherein said collapsible support member comprises an articulated support having at least a first arm, a second arm, and a hinge articulating the first and second arms.

7. A ventilation support for a laptop computer, comprising:
a planar panel having a front edge and a rear edge;
means for pivotally attaching the front edge of said panel to a front edge of a bottom surface of a laptop computer, whereby the panel is movable between an open position and a closed position;
at least one collapsible support member having a first end and a second end, the first end being engaged to said panel, the collapsible support member further having a rigid, unitary rectangular body, the first end of the body having pins extending laterally therefrom, said panel having a recess therein defining a track, the track having opposing top flanges extending into the recess above the pins in order to slidably and rotatably retain the first end of the collapsible support member in the track; and
means for attaching the second end of said collapsible support member to the bottom surface of the laptop computer.

8. The ventilation support according to claim 7, wherein said track has a pocket defined in an end thereof, the pin being lowered into the pocket to lock the panel in the open position, and raised from the pocket to slide along the track into the closed position.

9. The ventilation support according to claim 7, wherein said panel has a thickened portion extending below the panel and defining a foot, the track being defined in the foot.

10. The ventilation support according to claim 7, wherein said collapsible support member comprises an articulated support having at least a first arm, a second arm, and a hinge articulating the first and second arms.

11. A laptop computer with ventilation support, comprising:
a laptop computer having a base, a keyboard mounted in the base, and a display screen pivotally attached to the base, the base defining a bottom surface of the laptop computer and having a front edge and a rear edge;
a planar panel having a front edge and a rear edge, the front edge being pivotally attached to the front edge of the base of the laptop computer, whereby the base is movable between a closed position abutting the panel and an open position with the rear edge of the base raised above the panel, the panel having at least one recess defined therein; and
at least one collapsible support member having a first end and a second end, the first end being pivotally attached to the panel and the second end being pivotally attached to the bottom surface of the laptop computer adjacent the rear edge, the collapsible support member being disposed within the panel recess when the panel is in the closed position so that the bottom surface of the laptop computer lies flush against the panel and raised upward to prop up the rear edge of the base in the open position.

12. The laptop computer according to claim 11, wherein said recess comprises a track defined within said panel, the first end of said at least one collapsible support member being slidably and pivotally engaged in the track.

13. The laptop computer according to claim 12, wherein said collapsible support member comprises a rigid, unitary rectangular body, the first end of the body having pins extending laterally therefrom, the track having opposing top flanges extending into the recess above the pins in order to slidably and rotatably retain the first end of the collapsible support member in the track.

14. The laptop computer according to claim 13, wherein said track has a pocket defined in an end thereof, the pin being lowered into the pocket to lock the panel in the open position, and raised from the pocket to slide along the track into the closed position.

15. The laptop computer according to claim 12, wherein said panel has a thickened portion extending below the panel and defining a foot, the track being defined in the foot.

16. The laptop computer according to claim 11, wherein said collapsible support member comprises an articulated support having at least a first arm, a second arm, and a hinge articulating the first and second arms.

17. The laptop computer according to claim 11, wherein said at least one collapsible support member comprises two collapsible support members disposed adjacent opposite sides of said panel and said base.

* * * * *